(12) United States Patent
Koltuk et al.

(10) Patent No.: US 9,304,733 B2
(45) Date of Patent: Apr. 5, 2016

(54) DISPLAY APPARATUS, DISPLAY SYNCHRONIZATION APPARATUS, DISPLAY SYNCHRONIZATION SYSTEM, AND METHOD FOR SYNCHRONIZING OF DISPLAY APPARATUS

(71) Applicant: SAMSUNG ELECTRONICS CO., LTD., Suwon-si (KR)

(72) Inventors: Hayri Uğur Koltuk, Warsaw (PL); Anton Komlev, Warsaw (PL); Pavel Gueorguiev Vassilovski, Bydgoszcz (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 13/912,697

(22) Filed: Jun. 7, 2013

(65) Prior Publication Data

US 2013/0328745 A1    Dec. 12, 2013

(30) Foreign Application Priority Data

Jun. 8, 2012  (KR) .......................... 10-2012-0061599

(51) Int. Cl.
*G06F 3/14* (2006.01)

(52) U.S. Cl.
CPC .......... *G06F 3/1446* (2013.01); *G09G 2350/00* (2013.01); *G09G 2370/025* (2013.01)

(58) Field of Classification Search
CPC ................... G09G 2300/023; G09G 2360/04; G09G 2300/026; G09G 2356/00; G06F 3/1446
USPC ........................................................... 345/1.3
See application file for complete search history.

(56) References Cited

U.S. PATENT DOCUMENTS

| | | | |
|---|---|---|---|
| 6,046,709 A | 4/2000 | Shelton et al. | |
| 6,308,223 B1 | 10/2001 | Opgenoorth | |
| 2003/0037194 A1* | 2/2003 | Mukherjee | 710/260 |
| 2007/0089058 A1 | 4/2007 | Dias et al. | |
| 2008/0165161 A1* | 7/2008 | Platzer et al. | 345/177 |
| 2010/0083324 A1 | 4/2010 | Smith et al. | |
| 2010/0111491 A1 | 5/2010 | Kamoto | |
| 2011/0178854 A1 | 7/2011 | Sofer et al. | |
| 2012/0075334 A1* | 3/2012 | Pourbigharaz et al. | 345/619 |

* cited by examiner

*Primary Examiner* — Jason Olson
*Assistant Examiner* — Deeprose Subedi
(74) *Attorney, Agent, or Firm* — Sughrue Mion, PLLC (57) ABSTRACT

A method of synchronizing of a plurality of display apparatuses. The method includes determining a victim function, receiving a count value counting a number of times that the victim function is called in a predetermined period of time from at least one display apparatus, determining a minimum count value by comparing the received count values with each other, and synchronizing the plurality of display apparatuses based on the determined minimum count value such that the plurality of display apparatuses synchronize to the display apparatus with the slowest display execution speed.

21 Claims, 9 Drawing Sheets

DISPLAY APPARATUS, DISPLAY SYNCHRONIZATION APPARATUS, DISPLAY SYNCHRONIZATION SYSTEM, AND METHOD FOR SYNCHRONIZING OF DISPLAY APPARATUS

CROSS-REFERENCE TO RELATED APPLICATION

This application claims priority from Korean Patent Application No. 10-2012-0061599, filed on Jun. 8, 2012 in the Korean Intellectual Property Office, the disclosure of which is incorporated herein by reference in its entirety.

BACKGROUND

1. Field

Methods and apparatuses consistent with exemplary embodiments broadly relate to a display synchronization apparatus and a method thereof, and more particularly, to a method of synchronizing a plurality of display apparatuses with each another, to a display apparatus, to a display synchronization apparatus, and to a display synchronization system thereof.

2. Description of the Related Art

A plurality of display apparatuses are used together in various fields such as advertisement, entertainment, sport, and broadcasting. Synchronizing the plurality of display apparatuses with each other in these various fields may be an important factor to obtain a desired display quality.

For example, in the case of a video wall, which is commonly used in an exhibition, display apparatuses constituting the video wall display the same image or display different images and combine them, thereby displaying an entire single image. In this case, in order to display a natural and harmonious image, the plurality of display apparatuses of the video wall should guarantee a uniform display speed.

One of the methods for synchronizing a plurality of display apparatuses is allowing each display apparatus to have its own unique synchronization algorithm. For example, a program driven in each display apparatus may include a unique synchronization algorithm routine. According to circumstances, the display apparatuses may generate synchronization signals and operate programs according to the synchronization signals, thereby perform a display synchronization.

However, a plurality of programs associated with graphic display (for example, Adobe Flash Player™ and Microsoft Powerpoint™) do not provide a mechanism to synchronize with other display apparatuses.

For example, if the plurality of display apparatuses forming the video wall in the above example display the same image by driving the Adobe Flash Player™, simultaneous display is not guaranteed among the plurality of display apparatuses, even if the display of the images starts at the same time. This is because, if the different display apparatuses display the same content such as a file or a stream, there is a difference in a display time due to various factors such as a difference in hardware, a CPU load, and a system condition, as long as the display apparatuses do not have their own synchronization mechanisms.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a method for synchronizing a plurality of display apparatuses, which, if a plurality of display apparatuses display the same image using a program without a synchronization mechanism, synchronizes the plurality of display apparatuses, thereby displaying the same image simultaneously, a display apparatus, a display synchronization apparatuses, and a display synchronization system thereof.

According to an aspect of an exemplary embodiment, there is provided a method of synchronizing of a plurality of display apparatuses, the method including: determining a function, receiving a count value counting a number of times that the function is called in a predetermined period of time from at least two display apparatuses from among the plurality of display apparatuses, determining a minimum count value by comparing the received count values with each other, and synchronizing the plurality of display apparatuses with each other based on the determined minimum count value.

The synchronizing may include: determining a first display apparatus that has the minimum count value in the predetermined period of time from among the plurality of display apparatuses, calculating a difference between the count value of the first display apparatus and a count value of a second display apparatus, and, if the difference between the count values is greater than a predetermined value, transmitting an execution delay command to the second display apparatus.

The function may be called at least once during a single execution of a rendering loop of a program for displaying a GUI.

Each of the plurality of display apparatuses may operate as a portion of a single large display screen.

The plurality of display apparatuses may include one of a digital signage, an LFD, and a DID.

The difference between the count values may be adjusted to account for a network delay that transmits respective count values.

According to yet another aspect of an exemplary embodiment, there is provided a method of synchronizing a slave display apparatus, the method including: counting a number of times that a function is called in a predetermined period of time, transmitting to a master display apparatus a count value counting a number of times that the function is called, if a difference between the transmitted count value and a count value counting a number of times that a function of another display apparatus is called is greater than a predetermined number, transmitting an execution delay command from the master display apparatus, and in response to receiving the delay execution command, delaying executing display in the slave display apparatus.

The minimum count value may be the least value out of the transmitted count value and at least one count value provided by said another display apparatus.

The function may be called at least once during a single execution of a rendering loop of a program for displaying a GUI.

The difference between the count values may be calculated by inserting a function counting the number of times that the function is called in an API (Application Program Interface) hooking method.

According to yet another aspect of another exemplary embodiment, there is provided a method of synchronizing a plurality of display apparatuses, the method including: determining, by a master display apparatus, a function, counting, by at least one slave display apparatus, a number of times that the function is called in a predetermined period of time, transmitting to the master display apparatus, by the at least one slave display apparatus, a count value which is the number of times that the function is called, determining a minimum count value by comparing the received count values with each other, and synchronizing the master display apparatus with the at least one slave display apparatus based on the minimum count value.

The synchronizing may include: determining, by the master display apparatus, a first display apparatus that has the minimum count value in the predetermined period of time from among the plurality of display apparatuses, calculating, by the master display apparatus, a difference between the count value of the first display apparatus and a count value of a second display apparatus from among the plurality of display apparatuses, if the difference is greater than a predetermined value, transmitting, by the master display apparatus, an execution delay command to the second display apparatus, and in response to receiving the execution delay command, delaying, by the second display apparatus, executing display.

According to another aspect of another exemplary embodiment, there is provided a display synchronization apparatus including: a communication interface which receives a count value which is a number of times that a function is called in a predetermined period of time from at least one display apparatus, and a controller which determines the function, and synchronizes a plurality of display apparatuses including the at least one display apparatus with each other based on a minimum count value from among count values received from the plurality of display apparatuses.

The controller may determine a first display apparatus that has the minimum count value in the predetermined period of time from among the plurality of display apparatuses, and the controller may calculate a difference between the count value of the first display apparatus and a count value of a second display apparatus from among the plurality of display apparatuses, and, if the difference between the count values is greater than a predetermined value, may control the communication interface to transmit an execution delay command to the second display apparatus.

The function may be called at least once during a single execution of a rendering loop of a program for displaying a GUI.

The controller may adjust the calculated difference between the count values based on a network delay.

According to yet another aspect of another exemplary embodiment, there is provided a slave display apparatus including: a display which displays a GUI, a communication interface which transmits, to a master display apparatus, a count value which is a number of times that a function is called, and receives, from the master display apparatus, an execution delay command, which is generated if a different between the transmitted count value and a count value indicating a number of times that a function of another display apparatus is called is greater than a predetermined value, and a controller which counts the number of times that the function is called in a predetermined period of time, and controls to delay display execution in response to the received execution delay command.

The minimum count value may be the least value out of the transmitted count value and the count value of said another display apparatus and wherein the execution delay command is generated if the difference between the minimum count value and the transmitted count value is greater than the predetermined value.

According to yet another aspect of another exemplary embodiment, there is provided a display synchronization system including: a master display apparatus which determines a function, and synchronizes a plurality of display apparatuses based on a minimum count value from among count values provided by the plurality of display apparatuses, and at least one slave display apparatus which transmits a respective count value from among the count values to the master display apparatus in a predetermined period of time, wherein the count value is a value counting a number of times that the function is called in the predetermined period of time.

The master display apparatus may determine a first display apparatus that has a minimum count value from among the plurality of display apparatuses, and, if a difference between the count value of the first display apparatus and a count value of a second slave display apparatus of the plurality of display apparatuses is greater than a predetermined value, may transmit an execution delay command to the second slave display apparatus. If the execution delay command is received, the second slave display apparatus may delay display execution.

As described above, even if the plurality of display apparatuses display the same image using a program without a synchronization mechanism, the plurality of display apparatuses can be synchronized and can display the same image simultaneously.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Hereinafter, exemplary embodiments will be described in greater detail with reference to the accompanying drawings.

In the following description, same reference numerals are used for the analogous elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
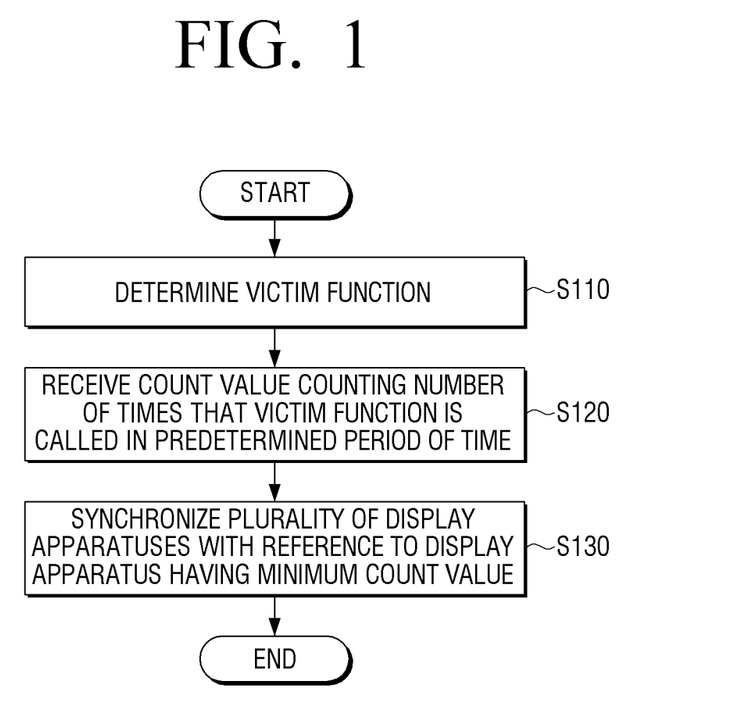
FIG. 1 is a flowchart illustrating a method of synchronizing a display apparatus to one or more other display apparatuses according to an exemplary embodiment.

FIG. 1 is a flowchart illustrating a method of synchronizing a display apparatus to one or more other display apparatuses according to an exemplary embodiment.

Referring to FIG. 1, a method of synchronizing a display apparatus to one or more other display apparatuses according to an exemplary embodiment includes determining a victim function (in operation S110), receiving a count value (in operation S120), and synchronizing a plurality of display apparatuses (in operation S130).

In order to synchronize the plurality of display apparatuses, a victim function is determined first (in operation S110). The victim function refers to a function that is called at least once while a rendering loop of a program for displaying a graphic user interface (GUI) is executed one time.

Every program for displaying the GUI has a main rendering loop to display the GUI. The rendering loop includes at least one important system function such as BeginPaint ( ), glutSwapBuffers ( ), glBegin ( ), BeginDraw ( ), and BeginScene ( ), These functions are called at least once every time the loop is repeated. Accordingly, if operations of these functions are traced, it is possible to evaluate a condition of a display.

Accordingly, the method of synchronizing the display apparatus to one or more other display apparatuses according to an exemplary embodiment selects one of the above system functions, traces a number of times that the selected function is called for a predetermined time, and evaluates a displaying condition of the display apparatus. The selected function is defined as a victim function.

According to yet another exemplary embodiment, two or more victim functions may be determined. These victim functions are used to evaluate an execution speed of a display apparatus by comparing the number of calls, as will be explained below. However, transmission of a count value counting the number of calls may be delayed or omitted according to a temporary situation of a network or a display apparatus. Also, in this case, an error may occur in the above-described evaluating process. If only one victim function is referred to, a probability that the error fails to be corrected increases. Therefore, two or more victim functions may be used.

If the victim function is determined, a count value is received from another display apparatus (in operation S120). The count value is a value counting a number of times that the victim function is called in this other display apparatus. That is, each of the plurality of display apparatuses counts the number of times that its own victim function is called. The number of calls of the victim function may be easily counted by inserting a code, which performs addition when the victim function is called e.g., increment variable i by one (i++) each time the function is executed. For example, if an EndPaint ( ) function included in the rendering loop is determined as the victim function, a HookedEndPaint ( ) function for counting the number of calls of the victim function may be created and may be injected or inserted into the rendering loop in an APK hooking method (for details see FIG. 4).

The number of times a victim function is executed is counted in a predetermined period of time by each of the plurality of display apparatuses, and, if the predetermined period of time elapses, the counting value is initialized and then counting is performed again. Therefore, every time that the predetermined period of time elapses, the counting is performed again.

The display apparatus, which is to synchronize with the plurality of display apparatuses, receives the count value from another display apparatus every time the predetermined period of time elapses. Another display apparatus may be a plurality of display apparatuses.

If the count value of the victim function is received, the plurality of display apparatuses are synchronized with one another with reference to a display apparatus that has a minimum count value from among the plurality of display apparatuses (in operation S130). The display apparatus having the minimum count value has the lowest execution speed due to factors such as a difference in hardware, a CPU load, and a system condition. The synchronization is achieved by making the execution speeds of the plurality of display apparatuses coincide with one another by decreasing the execution speed of other display apparatuses with reference to the display apparatus having the lowest execution speed. Moreover, in an exemplary embodiment, if the display apparatus receives a count value from another display apparatus that suggest the execution speed higher than its current execution speed. The display apparatus does not adjust its execution speed but remains at its current execution speed, as it is the display apparatus with the slowest execution speed. In another exemplary embodiment, the display apparatus compares the received count values with its own count value (internally calculated) to determine the minimum count value. If its own count value is the minimum count value, the display apparatus does not adjust the execution speed.

Figure 2:
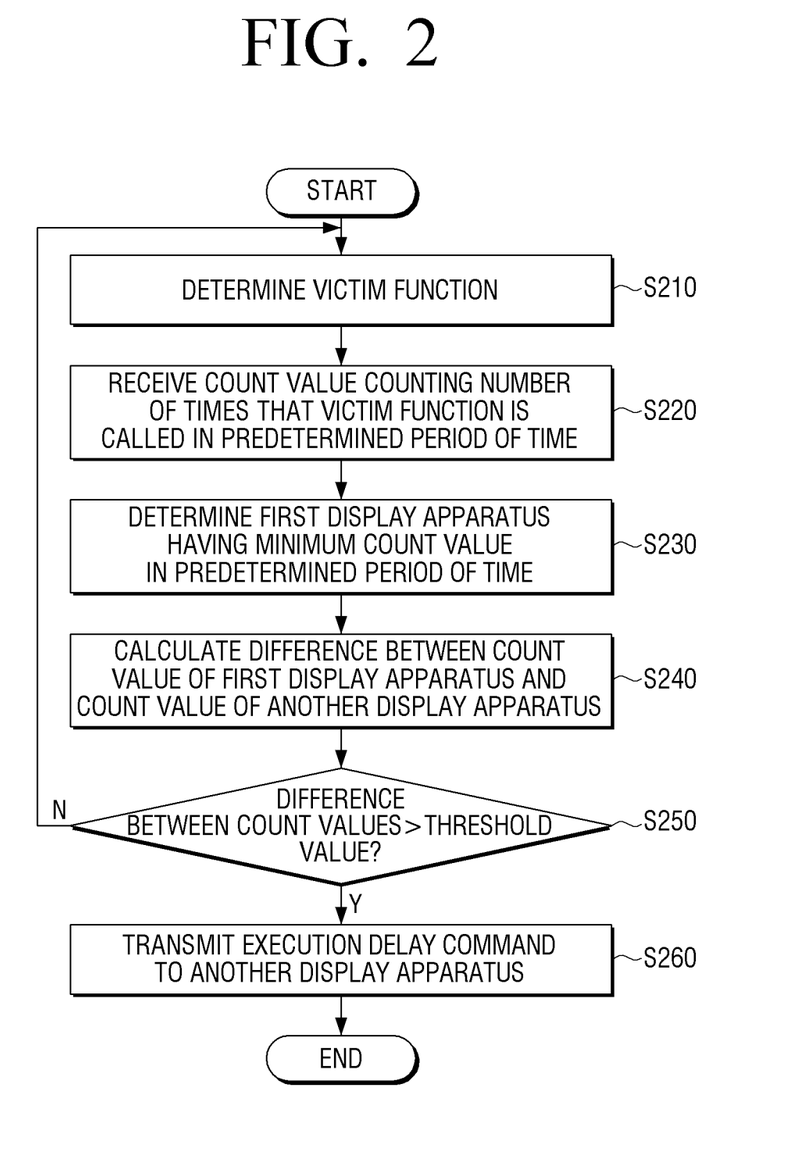
FIG. 2 is a flowchart illustrating a method of synchronizing a display apparatus to one or more other display apparatuses according to another exemplary embodiment.

FIG. 2 is a flowchart illustrating a method of synchronizing a display apparatus to one or more other display apparatuses according to another exemplary embodiment.

Referring to FIG. 2, the method of synchronizing the display apparatus to one or more other display apparatuses according to another exemplary embodiment includes determining a victim function (in operation S210), receiving a count value (in operation S220) from each of the plurality of other display apparatuses, determining a first display apparatus that has a minimum count value (in operation S230), calculating a difference between the received count values (in operation S240), and transmitting an execution delay command (in operations S250 and S260).

The determining the victim function (in operation S210) and the receiving of the count value (in operation S220) are analogous to the operations S110 and S120 in the above-described exemplary embodiment, and thus detailed explanation of these operations herein omitted.

If the count value is received, a display apparatus that has a minimum count value is determined (in operation S230). That is, it is determined which display apparatus has counted a minimum number of executions of the victim function as reflected by the count value from among the count values calculated for a predetermined period of time. The display apparatus having the minimum count value executes a rendering loop at a slowest speed, and thus may serve as a reference apparatus for synchronization by the other display apparatuses.

If the display apparatus that has transmitted the minimum count value (a first display apparatus) is determined, a difference between the count value of the first display apparatus and a count value of another display apparatuses is calculated (in operation S240).

If the difference between the count values is greater than a predetermined threshold value (in operation S250-Y), an execution delay command is transmitted to another display apparatus (in operation S260). If the difference between the count values is greater than the predetermined threshold value, it is determined that a rendering loop execution time of the other display apparatus is significantly faster than a rendering loop execution time of the display apparatus having the minimum count value. If the difference in the rendering loop execution time is not reduced, there may be a visually identifiable difference between displaying times of the same GUI screen displayed by both of the display apparatuses after the rendering loop is repeatedly performed. Accordingly, to reduce the difference in the rendering loop execution time, the execution delay command is transmitted to the other display apparatus.

The other display apparatus delays executing the rendering loop for a short time according to the execution delay command. This process is achieved by delaying the victim function or a specific function of the rendering loop or a thread of an instance for a predetermined time with or without an assistance of an operating system (OS).

On the other hand, if the difference between the count values is less than the predetermined threshold value (in operation S250-N), an execution command may be transmitted to the other display apparatus or no commands are transmitted to the other display apparatus.

In the above exemplary embodiment, the display apparatus that determines the victim function and receives the count value from another display apparatus, and the other display may display some display screens which constitute a single large display screen.

The display apparatuses may be realized by one of a digital signage, a large format display (LFD), and a digital information display (DID). Alternatively, one of the digital signage, the LFD, and the DID may be realized by combining the display apparatuses.

Also, the calculating the difference between the count values may be performed further considering a network delay. For example, if one of the other display apparatuses is connected to a display apparatus that determines a victim function through wireless fidelity (WiFi) and another of the other display apparatuses is connected to the display apparatus that determines the victim function through a high speed network, a network delay may be further considered in determining the difference between the count values i.e. the network delay will be accounted for in comparing count values of the other display apparatuses. If a count value is not transmitted from another display apparatus connected through WiFi, the calculating the difference between the count values is skipped with respect to the other display apparatus. After that, if a count value is received from the other display apparatus, the count value should have been compared in the previous stage and thus is not calculated and a next count value is awaited.

Figure 3:
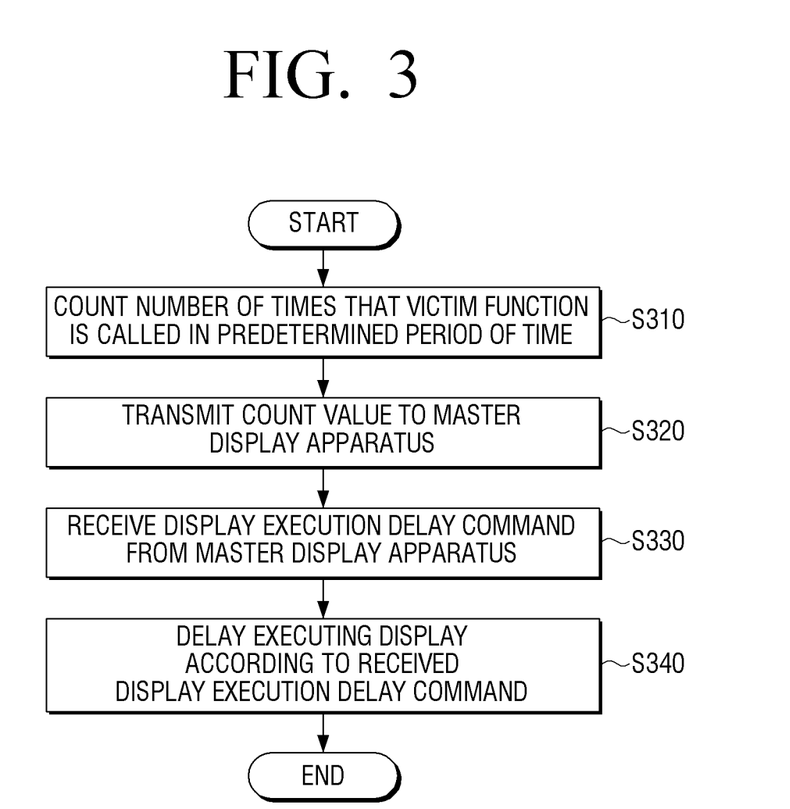
FIG. 3 is a flowchart illustrating a method of synchronizing of a display apparatus to one or more other display apparatuses according to still another exemplary embodiment.

FIG. 3 is a flowchart illustrating a method of synchronizing a display apparatus to one or more display apparatuses according to still another exemplary embodiment.

Referring to FIG. 3, the method of synchronizing a slave display apparatus according to still another exemplary embodiment includes counting a number of calls of the victim function in a predetermined period of time (in operation S310), transmitting a count value to a master display apparatus (in operation S320), receiving a display execution delay command from a master device (in operation S330), and delaying executing a display (in operation S340).

The slave display apparatus counts a number of times that a victim function is called in a predetermined period of time (in operation S310). As described above, a count value is a value counting a number of times that a victim function is called and the display apparatus counts a number of times that its own victim function is called. The number of calls of the victim function may be easily counted by inserting a code that performs addition when a victim function is called. For example, if an EndPaint ( ) function included in a rendering loop is determined as a victim function, a HookedEndPaint ( ) function for counting the number of calls of the victim function may be created and may be injected or inserted into the rendering loop in an API hooking method (see for details FIG. 4).

That is, the number of times that one or more of the important system functions, such as BeginPaint ( ), glutSwapBuffers ( ), glBegin ( ), BeginDraw ( ), and BeginScene ( ) described above, are called is counted in the predetermined period of time. The count value is transmitted to a master display apparatus.

Next, the slave display apparatus receives an execution delay command (in operation S320) which is generated according to the transmitted count value and a count value counting a number of times that a victim function of another display apparatus is called, from the master display apparatus (in operation S320).

More specifically, the master display apparatus receives the count value and determines a display apparatus that has a minimum count value. That is, the master display apparatus determines which display apparatus has counted a minimum count value from among the count values calculated in a predetermined period of time. The display apparatus having the minimum count value executes the rendering loop at a slowest speed and serves as a reference apparatus for synchronization with the other display apparatuses.

If the display apparatus that has transmitted the minimum count value is determined (a first display apparatus), the master display apparatus calculates a difference between the count value of the first display apparatus and a count value of another display apparatus.

If the difference between the count values is greater than a predetermined threshold value, the master display apparatus transmits an execution delay command to the other slave display apparatus. That is, if the difference between the count values is greater than the predetermined threshold value, it is determined that a rendering loop execution time of the other slave display apparatus is significantly faster than a rendering loop execution time of the display apparatus having the minimum count value. If the difference in the rendering loop execution time is not reduced, there may be a visually identifiable difference between the time when the same GUI screen is displayed by both of the display apparatuses after the rendering loop is repeatedly performed. Accordingly, to reduce the difference in the rendering loop execution time, the execution delay command is transmitted to the other slave display apparatus.

If the other slave display apparatus receives the execution delay command (in operation S330), the slave display apparatus delays executing display according to the execution delay command (in operation S340). That is, the other slave display apparatus delays executing the rendering loop for a short time according to the execution delay command. This process is achieved by delaying the victim function or a specific function of the rendering loop or a thread of an instance for a predetermined time with or without an assistance of the OS.

On the other hand, if the difference between the count values is less than the predetermined threshold value, the master display apparatus transmits an execution command to the other slave display apparatus or does not transmit any commands, and thus, the slave display apparatus continues executing the rendering loop without any delays.

In the above exemplary embodiment, the other slave display apparatus and the master display apparatus may display some display screens which form a single large display screen.

The display apparatuses may be realized by one of a digital signage, an LFD, and a DID. Alternatively, one of the digital signage, the LFD, and the DID may be realized by combining the master display apparatus and the slave display apparatus.

Also, the difference between the count values may be calculated taking into account a network delay. For example, if a certain slave display apparatus is connected to a master display apparatus through WiFi and another slave display apparatus is connected to the master display apparatus through a high speed network, a network delay may be considered (accounted for) in calculating the difference between the count values. For example, if a count value is not transmitted from the slave display apparatus connected through WiFi, the calculation of the difference between the count values is skipped with respect to the slave display apparatus. After that, if a count value is received from that slave apparatus, the received count value should have been compared in the previous stages and thus the difference between the count values is not calculated and a next count value is awaited.

Figure 4:
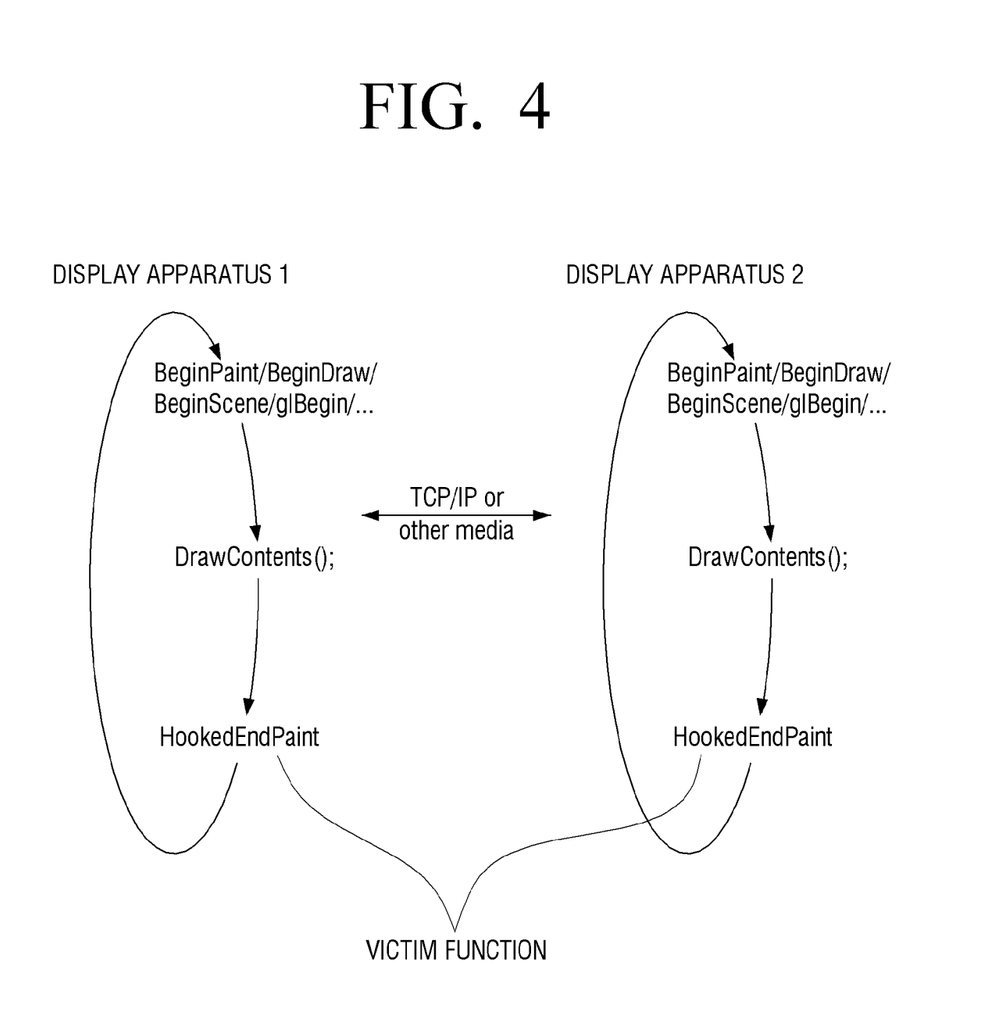
FIG. 4 is a view illustrating a method of synchronizing a display apparatus to one or more other display apparatuses according to an exemplary embodiment.

FIG. 4 is a view illustrating a method of synchronizing a display apparatus to one or more other display apparatuses according to various exemplary embodiments.

As shown in FIG. 4, the display apparatuses according to various exemplary embodiments exchange information with one another through a transmission control protocol/internet protocol (TCP/IP) or other media. An EndPaint ( ) function included in a rendering loop is determined as a victim function and a HookedEndPaint ( ) function for counting a number of times that the victim function is called is injected or inserted in an API hooking method. In an exemplary embodiment, the display apparatus 1 and 2 proceed with heir rendering loop including executing the Begin, Draw Contents( ) and EndPaint (where the HookedEndPaint is inserted).

Figure 5:
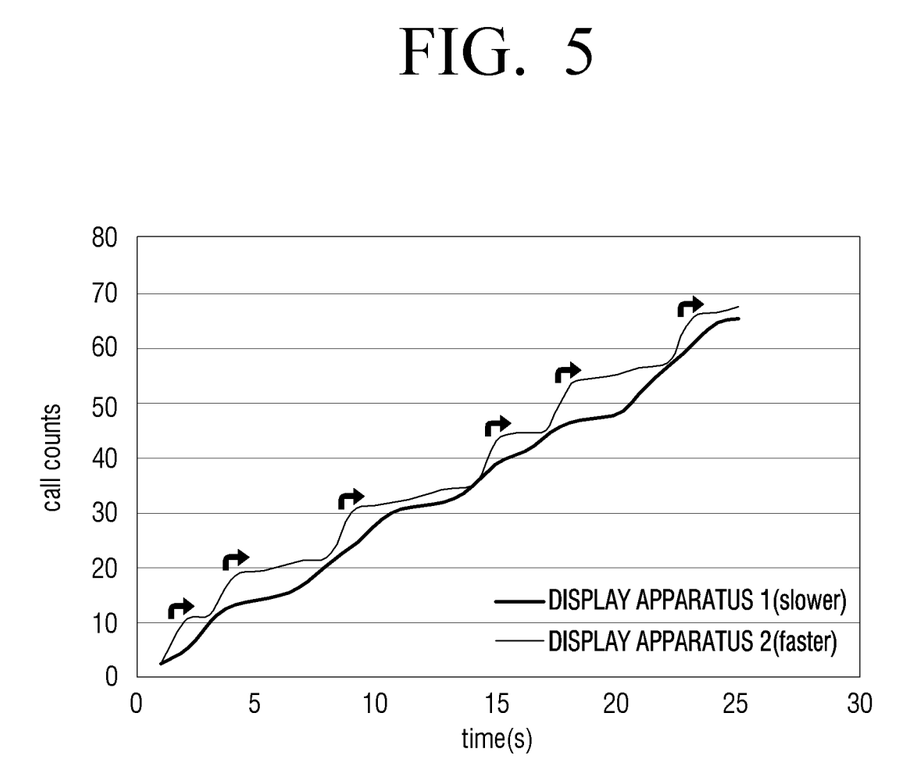
FIG. 5 is a graph illustrating a relationship between a time and a call count value according to an exemplary embodiment.

FIG. 5 is a graph illustrating a relationship between a time and a call count value according to an exemplary embodiment.

As shown in FIG. 5, there is a difference between display execution speeds of different display apparatuses due to factors such as a difference in hardware, a CPU load, and a system condition. A display apparatus 2 has a high rendering loop processing speed in comparison with a display apparatus 1, and, if a difference between count values of the display apparatus 2 and the display apparatus 1 is greater than a predetermined threshold value, the display apparatus 2 delays executing the rendering loop and thus there is a curved line in the graph showing delayed execution of the display apparatus 2. By doing so, the difference between the rendering loop execution speeds of the display apparatuses 1 and 2 is maintained lower than a predetermined gap.

Figure 6:
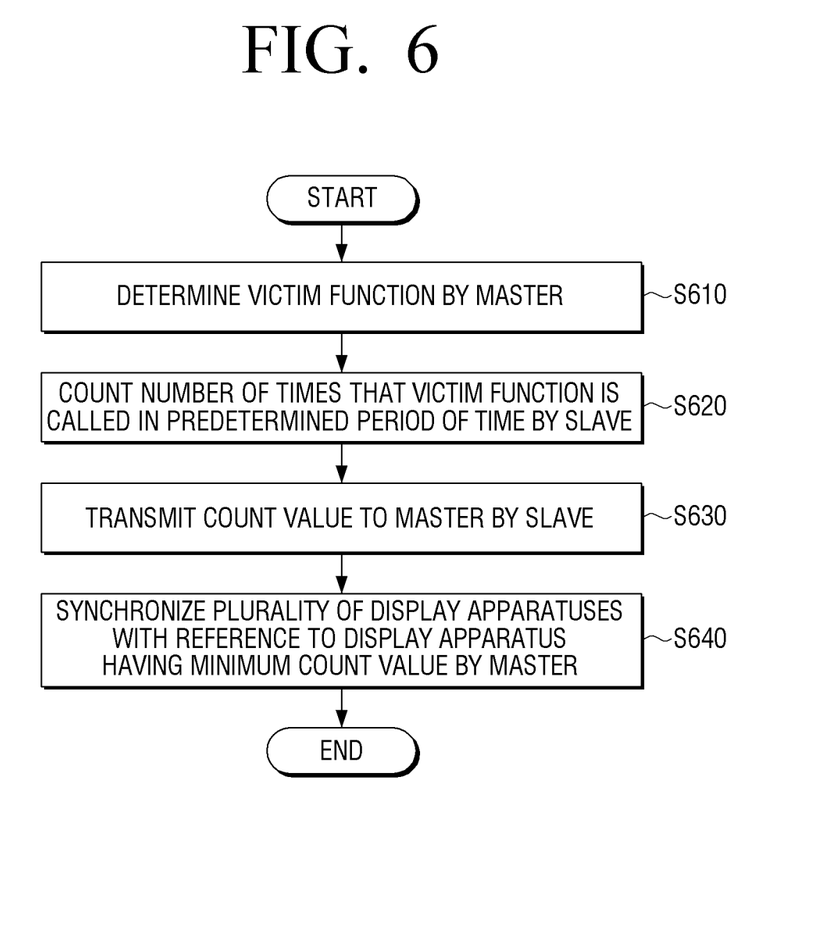
FIGS. 6 and 7 are flowcharts illustrating a method of synchronizing a display apparatus to one or more other display apparatuses according to still another exemplary embodiment.
Figure 7:
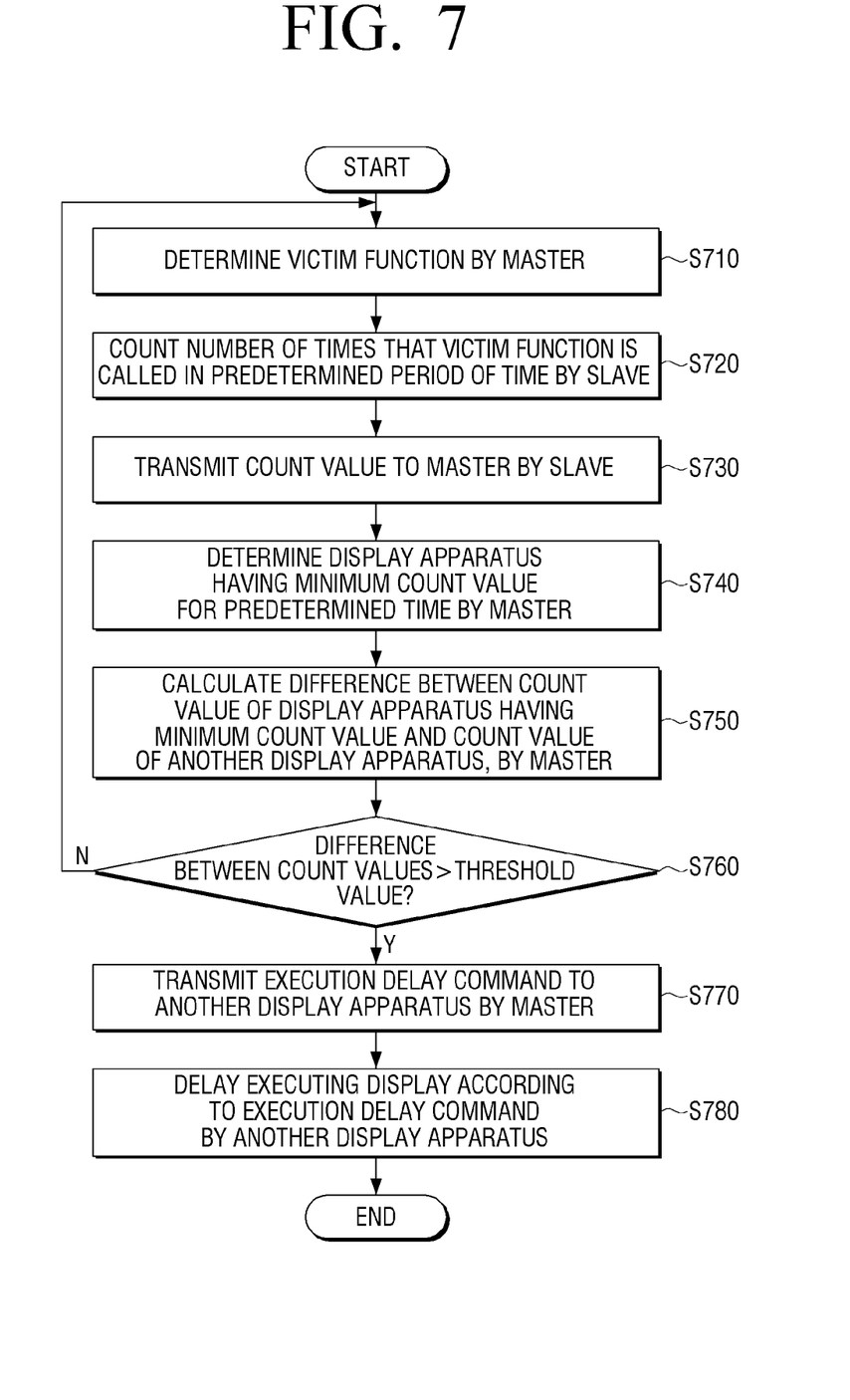

FIGS. 6 and 7 are flowcharts illustrating a method of synchronizing a display apparatus to one or more other display apparatuses according to still another exemplary embodiment.

Referring to FIG. 6, the method of synchronizing the display apparatus to one or more other display apparatuses according to still another exemplary embodiment includes determining, by a master display apparatus, a victim function (in operation S610), counting, by at least one slave display apparatus, a number of times that the victim function is called in a predetermined period of time (in operation S620), transmitting, by the at least one slave display apparatus, a count value counting the number of times that the victim function is called in the predetermined period of time to the master display apparatus (in operation S630), and synchronizing the master display apparatus and the at least one slave display apparatus with reference to a display apparatus that has a minimum count value from among a plurality of display apparatuses (in operation S640). In an exemplary embodiment, the master display apparatus executes the rendering loop faster than the slave display apparatus. If the master display apparatus may have the display execution speed slower than the slave display apparatus, it can compare its count value to the received count values and determine if it is the slowest display apparatus. If it is determined that the master display apparatus is the slowest display apparatus, it will use its own count value to synchronize the slave display apparatuses.

Referring to FIG. 7, a victim function is determined by the master (in operation S710); each slave display apparatus counts a number of time that it calls the victim function in a predetermined period of time (in operation S720); the count value is then transmitted to the master by each of the slaves (in operation S730). These operations 710, 720, and 730 are analogous to the operations S610, S620, and S630 described above. In FIG. 7, the synchronizing includes determining, by the master display apparatus, a first display apparatus that has a minimum count value in a predetermined period of time from among the plurality of display apparatuses (in operation S740), calculating, by the master display apparatus, a difference between the count value of the first display apparatus and a count value of another display apparatus of the plurality of display apparatuses (in operation S750), if a difference between the count values is greater than a predetermined threshold value (in operation S760-Y), transmitting, by the master display apparatus, an execution delay command to the other display apparatus (in operation S770), and delaying, by the other display apparatus, executing display according to the execution delay command (in operation S780).

Figure 8:
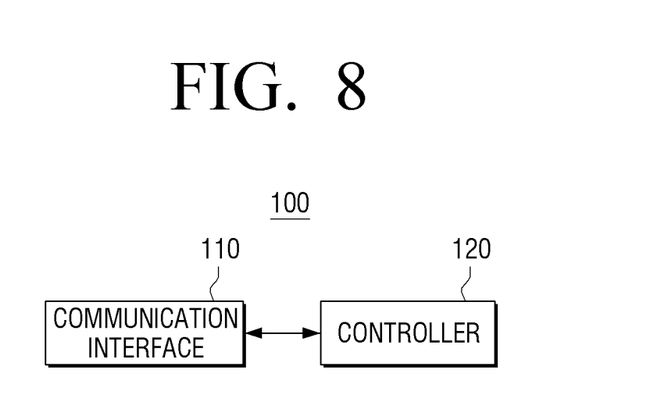
FIG. 8 is a block diagram illustrating a display synchronization apparatus according to an exemplary embodiment.

FIG. 8 is a block diagram illustrating a display synchronization apparatus 100 according to an exemplary embodiment.

Referring to FIG. 8, a display synchronization apparatus 100 according to an exemplary embodiment includes a communication interface 110 to receive a count value of a victim function, and a controller 120 to perform synchronization according to the count value. The communication interface 110 may be hardware, software, or a combination of the two. It may include a network interface card. The controller 120 may be hardware, software, or a combination of the two. It may be a processor configured to perform the operations described below.

The communication interface 110 receives a count value counting a number of times that a victim function is called in a predetermined period of time from at least one display apparatus. An exemplary process in which the communication interface 110 receives the count value of the victim function has been described above and thus a detailed explanation is omitted.

The controller 120 determines a victim function and synchronizes a plurality of display apparatuses to each other with reference to a display apparatus that has a minimum count value from among the plurality of display apparatuses.

An exemplary process of determining the victim function has been described above and the process of synchronizing the plurality of display apparatus with reference to the display apparatus that has the minimum count value has been also described, and thus a detailed description is omitted.

At this time, the controller 120 determines a first display apparatus that has a minimum count value in a predetermined period of time from among the plurality of display apparatuses, calculates a difference between the count value of the first display apparatus and a count value of another display apparatus from among the plurality of display apparatuses, and, if the difference between the count values is greater than a predetermined threshold value, controls the communication interface 110 to transmit an execution delay command to the other display apparatus.

An exemplary process of determining the first display apparatus and transmitting the execution delay command if the difference between the count values is greater than the predetermined threshold value have been described above, and thus a detailed description is omitted.

The display synchronization apparatus 100 may be one of the plurality of display apparatuses or may be an apparatus other than the plurality of display apparatuses. If the display synchronization apparatus 100 is one of the plurality of the display apparatuses, then it may include its own count value in determining the first device that has the minimum count value. Of the display synchronization apparatus 100 is a device other than the plurality of display apparatuses than it will not need to calculate and provide its own count value.

Figure 9:
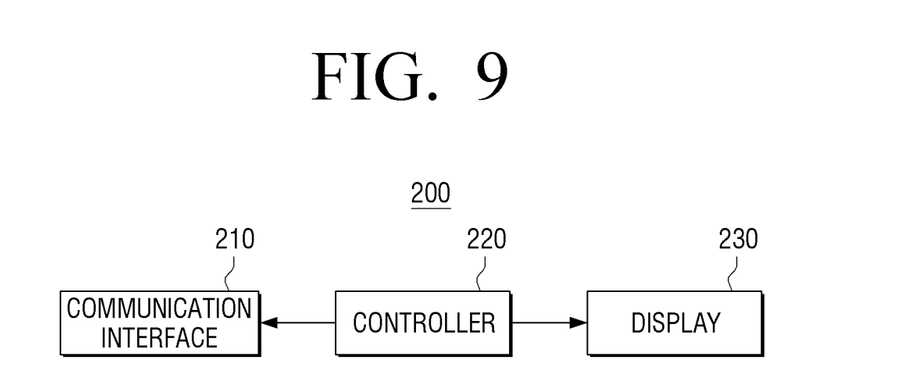
FIG. 9 is a block diagram illustrating a display apparatus according to an exemplary embodiment.

FIG. 9 is a block diagram illustrating a display apparatus 200 according to an exemplary embodiment.

Referring to FIG. 9, a display apparatus 200 according to an exemplary embodiment includes a display 230 to display a GUI, a communication interface 210 to transmit a count value counting a number of times that a victim function is called to a master display apparatus, and receive an execution delay command, which is generated according to the transmitted count value and a count value counting a number of times that a victim function of another display apparatus is called, from the master display apparatus, and a controller 220 to count the number of times that the victim function is called in a predetermined period of time and control the display 230 to delay executing display according to the execution delay command.

The display 230 displays a GUI and displays the GUI periodically according to the execution of a rendering loop. The display 230 may be an LCD, and so on.

The communication interface 210 transmits the count value and receives the execution delay command. An exemplary process has been described above and thus a detailed description is omitted. The communication interface 210 may include a network interface card.

The controller 220 counts the victim function and delays executing display if the execution delay command is received. An exemplary process has been described above and thus an overlapped explanation is omitted. The controller 220 may be a processor or a microprocessor.

The master display apparatus may be one of the plurality of display apparatuses or may be an apparatus other than the plurality of display apparatuses. The synchronization display apparatus 100 and the display apparatus 200 may also include a memory (not shown).

Figure 10:
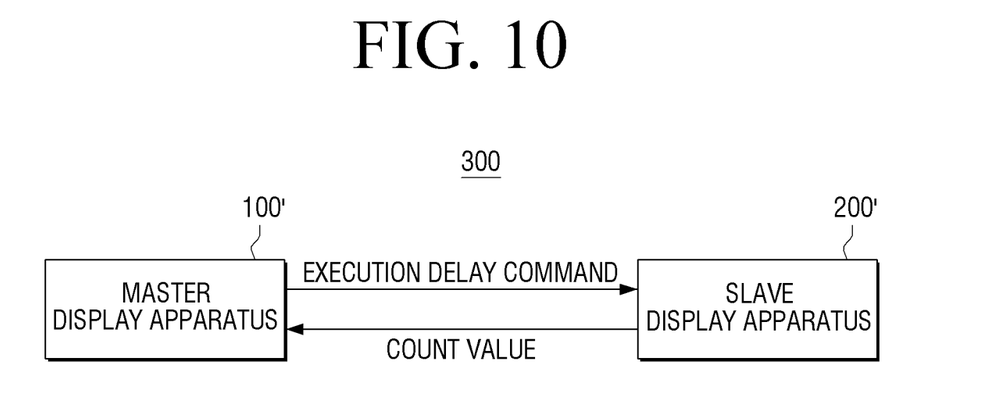
FIG. 10 is a block diagram illustrating a display synchronization system according to an exemplary embodiment.

FIG. 10 is a block diagram illustrating a display synchronization system 300 according to an exemplary embodiment.

Referring to FIG. 10, a display synchronization system 300 according to an exemplary embodiment includes a master display apparatus 100' and a slave display apparatus 200'.

The master display apparatus 100' transmits an execution delay command and the slave display apparatus 200' transmits a count value, and exemplary detailed functions thereof have been described above and thus detailed explanation herein is omitted.

As described above, even if the plurality of display apparatuses display the same image using a program without a synchronization mechanism such as Adobe Flash Player™ or Microsoft Powerpoint™, the plurality of display apparatuses can be synchronized and can display the same image simultaneously.

The foregoing exemplary embodiments are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art. It is understood that all possible changes and/or modifications in form and details may be made therein without departing from the spirit and scope of an inventive concept as defined by the appended claims and their equivalents. The scope is defined not by the detailed description of exemplary embodiments but by the appended claims, and their equivalents and all differences within the scope will be construed as being included in an inventive concept.

What is claimed is:

1. A method of synchronizing a plurality of display apparatuses, the method comprising:
    selecting a system function which is called at least once during a single execution of a rendering loop of a program for displaying a graphic user interface (GUI);
    receiving a number of times that the system function is called in a predetermined period of time, the number of times being counted by at least two display apparatuses among the plurality of display apparatuses;
    determining a minimum count value by comparing the numbers of times that the system function is called as counted by the at least two display apparatuses, with each other; and
    synchronizing the plurality of display apparatuses with each other based on the determined minimum count value.

2. The method as claimed in claim 1, wherein the synchronizing comprises:
    determining a first display apparatus that has the minimum count value in the predetermined period of time from among the plurality of display apparatuses;
    calculating a difference between the number of times that the system function called of the first display apparatus and the number of times that the system function is called of a second display apparatus; and
    if the difference between the number of times that the system function is called is greater than a predetermined value, transmitting an execution delay command to the second display apparatus.

3. The method as claimed in claim 1, wherein each of the plurality of display apparatuses operates as a portion of a single large display screen.

4. The method as claimed in claim 3, wherein the plurality of display apparatuses comprise one of a digital signage, an LFD, and a DID.

5. The method as claimed in claim 2, further comprising adjusting the calculated difference based on a network delay.

6. A method of synchronizing a slave display apparatus, the method comprising:
    counting the number of times that a system function is called in a predetermined period of time;
    transmitting to a master display apparatus the number of times that the system function is called;
    if a difference between the transmitted number and the number of times that a system function of another display apparatus is called in the predetermined period of time, is greater than a predetermined number, transmitting an execution delay command from the master display apparatus; and in response to receiving the delay execution command, delaying executing display in the slave display apparatus wherein the system function is called at least once during a single execution of a rendering loop of a program for displaying a graphical user interface (GUI).

7. The method as claimed in claim 6, wherein the minimum count value is the least value out of the transmitted number and at least one of the number of times that the system function is called provided by the another display apparatus.

8. The method as claimed in claim 6, wherein the difference between the transmitted number and the number of times that the system function of another display apparatus is called is calculated by inserting a function counting the number of times that the system function is called in an Application Program Interface hooking method.

9. A method of synchronizing a plurality of display apparatuses, the method comprising:

selecting, by a master display apparatus, a system function which is called at least once during a single execution of a rendering loop of a program for displaying a graphic user interface (GUI);

counting, by at least one slave display apparatus, the number of times that the system function is called in a predetermined period of time;

transmitting, to the master display apparatus, by the at least one slave display apparatus, the number of times that the system function is called;

determining a minimum count value by comparing the received numbers with each other; and synchronizing the master display apparatus with the at least one slave display apparatus based on the minimum count value.

10. The method as claimed in claim 9, wherein the synchronizing comprises:

determining, by the master display apparatus, a first display apparatus that has the minimum count value in the predetermined period of time from among the plurality of display apparatuses;

calculating, by the master display apparatus, a difference between the number of times that the system function is called of the first display apparatus and the number of times that the system function is called of a second display apparatus from among the plurality of display apparatuses;

if the difference is greater than a predetermined value, transmitting, by the master display apparatus, an execution delay command to the second display apparatus; and in response to receiving the execution delay command, delaying, by the second display apparatus, executing display.

11. A display synchronization apparatus comprising:

a communication interface which receives the number of times that a system function is called in a predetermined period of time from at least one display apparatus; and a controller which determines the system function, and synchronizes a plurality of display apparatuses comprising the at least one display apparatus with each other based on a minimum count value from among the received numbers of the plurality of display apparatuses wherein the system function is called at least once during a single execution of a rendering loop of a program for displaying a graphical user interface (GUI).

12. The display synchronization apparatus as claimed in claim 11, wherein the controller determines a first display apparatus that has the minimum count value in the predetermined period of time from among the plurality of display apparatuses, wherein the controller calculates a difference between the number of times that the system function is called of the first display apparatus and the number of times that the system function is called of a second display apparatus from among the plurality of display apparatuses, and, if the difference between the numbers is greater than a predetermined value, controls the communication interface to transmit an execution delay command to the second display apparatus.

13. The display synchronization apparatus as claimed in claim 12, wherein the controller adjusts the calculated difference between the numbers based on a network delay.

14. A slave display apparatus comprising:

a display which displays a graphic user interface (GUI);

a communication interface which transmits, to a master display apparatus, the number of times that a system function is called, and receives, from the master display apparatus, an execution delay command, which is generated if a difference between the transmitted number and the number of times that a system function of another display apparatus is called is greater than a predetermined value; and a controller which counts the number of times that the system function is called in a predetermined period of time, and controls to delay display execution in response to the received execution delay command wherein the system function is called at least once during a single execution of a rendering loop of a program for displaying a graphical user interface (GUI).

15. The slave display apparatus as claimed in claim 14, wherein a minimum count value is the least value out of the transmitted number and at least one of the number of times that the system function is called of the another display apparatus and wherein the execution delay command is generated if the difference between the minimum count value and the transmitted number is greater than the predetermined value.

16. A display synchronization system comprising:

a master display apparatus which selects a system function that is called at least once during a single execution of a rendering loop of a program for displaying a graphic user interface (GUI), and synchronizes a plurality of display apparatuses based on a minimum count value from among the number of times that the system function is called and provided by the plurality of display apparatuses; and at least one slave display apparatus which transmits a number from among the numbers of times that the system function is called to the master display apparatus in a predetermined period of time, wherein the count value is a value counting a number of times that the system function is called in the predetermined period of time.

17. The display synchronization system as claimed in claim 16, wherein the master display apparatus determines a first display apparatus that has a minimum count value from among the plurality of display apparatuses, and, if a difference between the number of times that the system function is called of the first display apparatus and the number of times that the system function is called of a second slave display apparatus of the plurality of display apparatuses is greater than a predetermined value, transmits an execution delay command to the second slave display apparatus, wherein, if the execution delay command is received, the second slave display apparatus delays executing display.

18. The method as claimed in claim 2, further comprising adjusting the difference based on a first network delay from transmitting the number of times that the system function is called from the first display apparatus and based on a second network delay from transmitting the number of times that the system function is called from the second display apparatus.

19. The method as claimed in claim 2, further comprising skipping the calculating of the difference when the number of times that the system function is called is not received by the second display apparatus at a predetermined time in a cycle and discarding the number of times that the system function is called from the second display apparatus if received after the predetermined time.

20. The method as claimed in claim 2, wherein the system function is a base system function that is called during a single execution of a rendering loop in a display program without a build in synchronization mechanism and wherein the first display apparatus and the second display apparatus form a video wall.

21. The method as claimed in claim 2, wherein the first display apparatus displays a first image and the second display apparatus displays a second image and wherein the first image and the second image form one integrated single image.

* * * * *